United States Patent
Zim et al.

(10) Patent No.: US 9,623,454 B2
(45) Date of Patent: Apr. 18, 2017

(54) METHOD AND COMPOSITION FOR DUST CONTROL

(71) Applicant: Ecolab USA Inc., St. Paul, MN (US)

(72) Inventors: Danilo Zim, São Paulo (BR); Fabio Peixoto Macedo Gomes, São Paulo (BR)

(73) Assignee: Ecolab USA Inc., St. Paul, MN (US)

( * ) Notice: Subject to any disclaimer, the term of this patent is extended or adjusted under 35 U.S.C. 154(b) by 516 days.

(21) Appl. No.: 14/181,631

(22) Filed: Feb. 15, 2014

(65) Prior Publication Data
US 2015/0232730 A1 Aug. 20, 2015

(51) Int. Cl.
| | | |
|---|---|---|
| C09K 3/22 | (2006.01) |
| B08B 17/00 | (2006.01) |
| B05D 7/00 | (2006.01) |
| E21F 5/02 | (2006.01) |
| E21F 5/06 | (2006.01) |
| B05D 1/36 | (2006.01) |
| B05D 1/02 | (2006.01) |

(Continued)

(52) U.S. Cl.
CPC .............. *B08B 17/00* (2013.01); *B05D 1/02* (2013.01); *B05D 1/34* (2013.01); *B05D 1/36* (2013.01); *B05D 7/00* (2013.01); *C09K 3/22* (2013.01); *E21F 5/00* (2013.01); *E21F 5/02* (2013.01); *E21F 5/06* (2013.01)

(58) Field of Classification Search
None
See application file for complete search history.

(56) References Cited

U.S. PATENT DOCUMENTS

| 4,417,992 A | 11/1983 | Roe et al. |
| 4,642,196 A * | 2/1987 | Yan .......................... C09K 3/22 252/88.1 |

(Continued)

FOREIGN PATENT DOCUMENTS

| DE | 2912326 A1 | 10/1980 |
| EP | 2514409 A1 | 10/2012 |

(Continued)

OTHER PUBLICATIONS

Abstracts of RU 2303700, Jul. 2007.*

*Primary Examiner* — Erma Cameron
(74) *Attorney, Agent, or Firm* — Kagan Binder, PLLC

(57) ABSTRACT

The invention is directed towards methods and compositions for treating piles of particulate materials to inhibit and prevent the loss of valuable fuel or mineral dust from being released from storage piles or open containers. The method involves applying separately to the pile two different compositions. When separate the two compositions are low viscosity and easy to spray. When combined the two form a gel coating that is resistant to erosion but is flexible while the pile or payload is still settling, jostling, being bumped, and otherwise moving around. This coating is especially effective for coal piles, iron ore piles, and also for piles within and/or being moved by open topped railroad cars. The coating's flexibility prevents the coating from becoming brittle and shattering. The coating has better performance than its ingredients do alone. As a result the invention can both prevent unwanted dust pollution as well as save its users money by avoiding loss of blown away material.

12 Claims, 1 Drawing Sheet

Treated with water - before

Treated with water - after (severe mass loss)

Treated with invention - before

Treated with invention - after (no mass loss)

(51) Int. Cl.
 B05D 1/34 (2006.01)
 E21F 5/00 (2006.01)

(56) References Cited

U.S. PATENT DOCUMENTS

| | | | |
|---|---|---|---|
| 4,802,914 A | | 2/1989 | Rosen et al. |
| 5,181,957 A | | 1/1993 | Gross et al. |
| 5,415,795 A | | 5/1995 | Roe et al. |
| 5,714,387 A | | 2/1998 | Fowee et al. |
| 2006/0243946 A1 | * | 11/2006 | Wolff ............... C09K 3/22 252/88.1 |
| 2006/0284137 A1 | | 12/2006 | Tran et al. |
| 2007/0249504 A1 | * | 10/2007 | Ballard ............. C09K 8/203 507/207 |
| 2008/0190160 A1 | | 8/2008 | Tran et al. |
| 2009/0127499 A1 | | 5/2009 | Tran et al. |
| 2010/0090160 A1 | | 4/2010 | Branning et al. |
| 2010/0112224 A1 | * | 5/2010 | Lott ................. B65G 3/02 427/333 |
| 2010/0140539 A1 | * | 6/2010 | Weagle ............. C09K 3/22 252/88.1 |
| 2010/0297358 A1 | * | 11/2010 | Bytnar ............. C09K 3/22 427/427 |
| 2013/0337181 A1 | | 12/2013 | Wolff et al. |
| 2014/0141162 A1 | | 5/2014 | Wolff et al. |

FOREIGN PATENT DOCUMENTS

| | | |
|---|---|---|
| WO | 2008100921 A2 | 8/2008 |
| WO | 2010045448 A1 | 4/2010 |
| WO | 2010085435 A1 | 7/2010 |

* cited by examiner

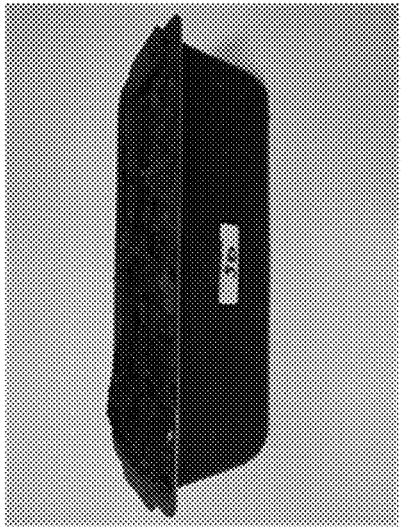
Treated with water - before
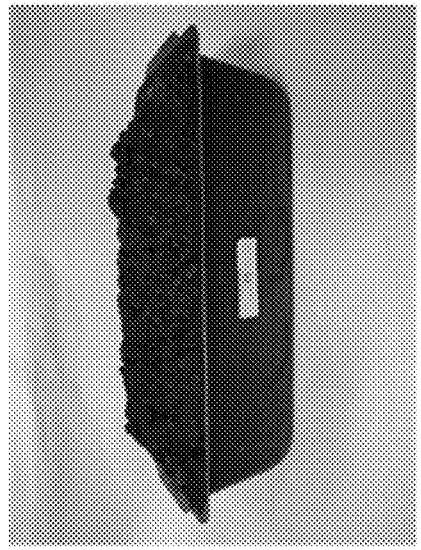
Treated with water - after (severe mass loss)
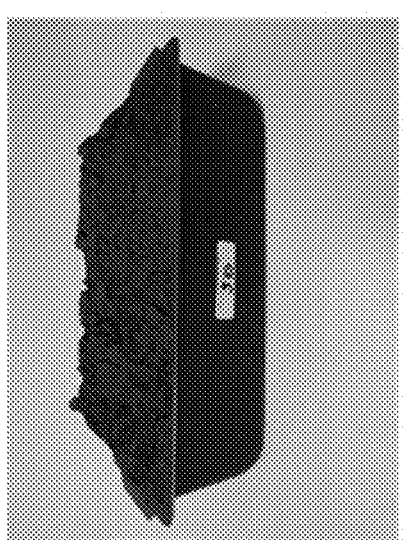
Treated with invention - before
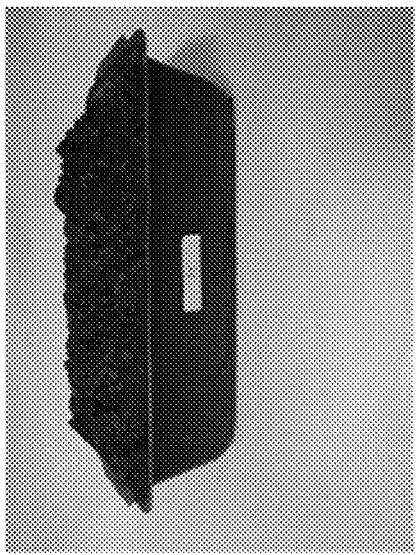
Treated with invention - after (no mass loss)

METHOD AND COMPOSITION FOR DUST CONTROL

CROSS-REFERENCE TO RELATED APPLICATIONS

Not Applicable.

STATEMENT REGARDING FEDERALLY SPONSORED RESEARCH OR DEVELOPMENT

Not Applicable.

BACKGROUND OF THE INVENTION

This invention relates to methods and compositions for containing particulate matter within open top receptacles including but not limited to open top hopper cars, trucks, piles, and similar storage and/or shipping containers. Treating a load of particulate material (and in particular coal and iron ore) with a binding agent (sometimes referred to as a crusting agent) to encrust a surface and thereby retain valuable material as well as prevent the spreading of dust from the particulate is known. Prior binding agents are described among other places in U.S. Pat. No. 5,441,566. These binding agents include latexes, petroleum products, and pine tar resins. Other binding agents include phenolaldehyde resin mixed with a polyisocyanate in the presence of a catalyst (described in U.S. Pat. No. 5,244,473), alkaline phenolic resin (described in U.S. Pat. No. 5,089,540), and styrene in a hygroscopic solvent (methyl ethyl ketone), polyvinyl acetate and water (described U.S. Pat. No. 5,487, 764). Additional dust suppressants are described in U.S. Pat. Nos. 5,181,957 and 5,747,104, 5,648,116, US Published Patent Application 2009/0189113 A1, and Published PCT Applications 02/12574 A1, 2010/110805 A1 and 2009/023652 A1.

Unfortunately many of these binders cause the particulate material to retain large amounts of water which can lead to diminished value and effectiveness. In the context of coal, increased water content results in decreased BTU content and increased likelihood of spontaneous combustion from water induced oxidation of the coal. Furthermore the binders tend to form brittle coatings which tend to shatter and dissipate as the particulate material settles and shifts due to the effects of transit and storage. Problems due to the brittleness of the binder coatings become exacerbated when the material is stored in environments where the temperature fluctuates above and below freezing. This is because freezing and melting moisture further shifts the materials further shattering the binder coating.

Prior art binding materials also have a number of winter handling problems that can render application difficult and potentially ineffective. This is because such products often have a freezing point near that of water and once frozen, they no longer work. Even worse these prior art binder coatings after being frozen are not recoverable even after they have thawed or melted if they have been frozen. This greatly limits the conditions in which they can be used and applied.

Thus it is clear that there is clear utility in novel methods and compositions for binding the top of particulate materials stored or shipped in open top containers. The art described in this section is not intended to constitute an admission that any patent, publication or other information referred to herein is "Prior Art" with respect to this invention, unless specifically designated as such. In addition, this section should not be construed to mean that a search has been made or that no other pertinent information as defined in 37 CFR §1.56(a) exists.

BRIEF SUMMARY OF THE INVENTION

To satisfy the long-felt but unsolved needs identified above, at least one embodiment of the invention is directed towards a method of inhibiting the release of dust from a pile of particulate material. The method comprises the step of applying to the exposed surface of the pile a binder composition. The binder composition comprises a first composition and a second composition. Each of the first and second composition have a viscosity of less than 100 cP when apart, but when mixed together they have a viscosity of more than 10,000 cP.

The first and second compositions may be separately applied to the pile and do not contact each other until after they have both been applied to the pile. The first composition may be a viscosity adjuster. The second composition may be a gellant. The first composition may be selected from the list consisting of: Alkylating Agents, Bases, Monoethanolamine, Diethanlonlamine, Diethanol coconut amide, Triethanolamine, Potassium Hydroxide, Sodium Hydroxide, Potassium Carbonate, Sodium Carbonate, Ammonium Hydroxide, and 2-amino, 2-methyl, 1-propanol, and any combination thereof. The second composition may be selected from the list consisting of: Nonionic Cellulose Ethers, Methylcellulose, Methylhydroxyethylcellulose, Methylhydroxypropylcellulose, Hidroxyethylcellulose, Hydroxypropylcellulose, Sodium carboxymethylcellulose, Ethylcellulose, Hydroxypropyl methyl cellulose, Carboxy polymethylene, Acrylic acid copolymer, and Carboxy vinyl polymer, and any combination thereof.

The pile may be within an open topped container. The pile may comprises one item selected from: coal, dirt, wood chips, agricultural products, fruits, fertilizers, ores, mineral ores, fine materials, sand, gravel, soil, fertilizers, or other dust generating material, and any combination thereof. The pile may be located at one item selected from: a railroad car, a ship's hold, a port, a mine, a railroad station, a truck, a road, an industrial facility, a refinery, a smelter, a packaging facility, a power plant, and any combination thereof. At least one or both of the compositions may be applied by spraying onto the pile. The compositions may be sprayed sequentially from the same spray apparatus. The first composition may be applied before and/or after the second composition. Both compositions may be simultaneously applied from different sprayers.

Additional features and advantages are described herein, and will be apparent from, the following Detailed Description.

BRIEF DESCRIPTION OF THE DRAWINGS

A detailed description of the invention is hereafter described with specific reference being made to the drawings in which:

The FIGURE is a number of photographs illustrating how the invention prevents erosion in a particulate material bed.

For the purposes of this disclosure, like reference numerals in the FIGURES shall refer to like features unless otherwise indicated. The drawings are only an exemplification of the principles of the invention and are not intended to limit the invention to the particular embodiments illustrated.

DETAILED DESCRIPTION OF THE INVENTION

The following definitions are provided to determine how terms used in this application, and in particular how the claims, are to be construed. The organization of the definitions is for convenience only and is not intended to limit any of the definitions to any particular category.

"Binder" means a material which when positioned over a substrate of particulate materials holds the mass together and thereby inhibits the tendency of the mass to release dust.

"Particulate material" means a material that has a tendency to form dust particles when handled, processed, or contacted, which includes but is not limited to coal, dirt, wood chips, agricultural products, fruits, fertilizers, ores, mineral ores, fine materials, sand, gravel, soil, fertilizers, iron, coal, or other dust generating material, and any combination thereof.

"Substrate" means a mass containing particulate material over which a binder is located.

"Comminuted" means powdered, pulverized, ground, or otherwise rendered into fine solid particles.

"Granulometry" means the process of measuring one or more grain sizes in a granular and/or particulate material.

"Stable Emulsion" means an emulsion in which droplets of a material dispersed in a carrier fluid that would otherwise merge to form two or more phase layers are repelled from each other by an energy barrier, the energy barrier may be 20 kT, the repulsion may have a half-life of a few years. Enabling descriptions of emulsions and stable emulsions are stated in general in *Kirk-Othmer, Encyclopedia of Chemical Technology*, Fourth Edition, volume 9, and in particular on pages 397-403.

"Surfactant" is a broad term which includes anionic, nonionic, cationic, and zwitterionic surfactants. Enabling descriptions of surfactants are stated in *Kirk-Othmer, Encyclopedia of Chemical Technology*, Third Edition, volume 8, pages 900-912, and in *McCutcheon's Emulsifiers and Detergents*, both of which are incorporated herein by reference.

"Water Soluble" means materials that are soluble in water to at least 3%, by weight, at 25 degrees C.

In the event that the above definitions or a description stated elsewhere in this application is inconsistent with a meaning (explicit or implicit) which is commonly used, in a dictionary, or stated in a source incorporated by reference into this application, the application and the claim terms in particular are understood to be construed according to the definition or description in this application, and not according to the common definition, dictionary definition, or the definition that was incorporated by reference. In light of the above, in the event that a term can only be understood if it is construed by a dictionary, if the term is defined by the Kirk-Othmer Encyclopedia of Chemical Technology, 5th Edition, (2005), (Published by Wiley, John & Sons, Inc.) this definition shall control how the term is to be defined in the claims.

At least one embodiment of the invention is directed towards the application of a gel binder to particulate material. The gel binder comprises two or more compositions of matter, each of the compositions having a viscosity of less than 100 cP (preferably less than 60 cP) when apart, but their mixture has a viscosity of more than 10,000 cP when they contact each other. The compositions only contact each other not before they have both been applied to the particulate material.

In at least one embodiment one of the compositions comprises a viscosity adjustment agent. Representative examples of viscosity adjustment agents include but are not limited to: Alkylating Agents, Bases, Monoethanolamine, Diethanlonlamine, Diethanol coconut amide, Triethanolamine, Potassium Hydroxide, Sodium Hydroxide, Potassium Carbonate, Sodium Carbonate, Ammonium Hydroxide, and 2-amino, 2-methyl, 1-propanol, and any combination thereof. In at least one embodiment the viscosity adjustment agent is a soluble base and/or soluble alkaline materials either organic and/or inorganic.

In at least one embodiment one of the compositions comprises a gellant. Representative examples of gellants include but are not limited to: Nonionic Cellulose Ethers, Methylcellulose, Methylhydroxyethylcellulose, Methylhydroxypropylcellulose, Hidroxyethylcellulose, Hydroxypropylcellulose, Sodium carboxymethylcellulose, Ethylcellulose, Hydroxypropyl methyl cellulose, Carboxy polymethylene, Acrylic acid copolymer, and Carboxy vinyl polymer, and any combination thereof. In at least one embodiment the gellant is a carboxylic polymer and/or polymers derived from cellulose, and/or is a film and/or fiber forming material.

Either one of the two compositions can be applied before the other. In addition, multiple alternating and/or simultaneous applications of the two compositions can be performed.

One or more of the compositions may further comprise a solvent and/or carrier fluid (including but not limited to water).

Referring now to the FIGURE there is shown an example of the effectiveness of the invention. The FIGURE demonstrates that a control application (water) is utterly ineffective at preventing erosion loss of particulate material from a sample iron ore bed. In contrast, under the same conditions a sample iron ore bed treated with Carboxymethylcellulose 0.2% after having been treated with Triethanolamine 0.5% (1.9 g/m2 after 11.9 g/m2) shows effective resistance to the same particulate material erosion.

While the combination of at least some of these gellants with at least some of these viscosity adjustment agents is not new, their effectiveness as a particulate material binder is quite novel and unexpected. As described for example in U.S. Pat. Nos. 8,292,973, 5,248,495, 7,824,665, 5,679,328, and 5,804,540, among others, the combination of gellants with viscosity agents have been known to be used as personal care products such as hair colorants, hand gels, personal wash liquids, shaving gel, and personal wash liquids. The manner of their use as personal care products however rely on properties that are undesirable and unwanted as a particulate material binder.

As previously stated, when separate the two or more compositions have a low viscosity and when combined the two have a high viscosity. As the high viscosity is of crucial importance for personal care products, in such uses the compositions are pre-mixed before application and are almost always sold in pre-mixed bottles. In contrast for binding operations, it is important that the materials have a low viscosity when applied. This is so common application techniques such as spray booms can be used to apply the binders. If the binder has too high a viscosity, then standard feed pumps cannot be used and the cost of applying the binder would become prohibitive and could even exceed the savings from dust mitigation.

Moreover the general purpose of personal care products is dissimilar from those of particulate material binders. For such personal care products as hair gel, the material is applied to a soft flexible substrate (hair) which does not erode and is to be formed into a particular arrangement solely for esthetic reasons. As such it is mixed into the hair and is applied in such amounts as to provide scaffolding support to the hair's arrangement. In contrast in the invention the substrate (for example ore) is rigid and therefore does not require scaffolding so it can be applied to the surface as a coating not a support. In addition unlike hair, particulate material substrates do erode. As a result it would not be obvious to apply compositions of matter useful as personal care products to such a dissimilar application.

In addition a particularly useful consequence of how the materials are applied manifests in their use as a binder but which is irrelevant as a personal care product. In at least one embodiment, when at least one or both of the low viscosity liquid(s) is applied over a surface that is formed of fine particles (including but not limited to coal and/or iron ore), the liquid(s) are at least partially absorbed. When the combination causes the viscosity to spike a thick gel layer forms at least partially within the bed. This gel layer encapsulates a number of the particles. As a result instead of just forming a coating that predominantly surrounds the outside of the bed, the binder also surrounds a much greater layer of the particulate materials within the bed as well. In contrast were the same resulting gel applied as a gel, the resulting protective layer would be much more superficial and thin because the absorption of a gel by the same surface is much more limited. In other words the low viscosity liquids can penetrate into the particulate material while the gel cannot. In at least one embodiment the distribution of the gel within the bed causes the binder to be less brittle than if it were more positioned more superficially.

The compositions may be applied in liquid form by a spray boom having one or more spray heads. In at least one embodiment the composition is applied according to any one of the methods or apparatuses of U.S. Pat. Nos. 5,441,566, 5,622,561, and any combination thereof.

In at least one embodiment, when contacted with each other the gellant is a solvent for the viscosity adjustment agent. In at least one embodiment, when contacted with each other the viscosity adjustment agent is a solvent for the gellant. In at least one embodiment, when contacted with each other the gellant and the viscosity adjustment agent from an azeotropic mixture. In at least one embodiment the change in viscosity is at least in part a result of the viscosity adjustment agent inducing a change in the structure of the gellant.

The compositions may be applied in combination with any of the compositions, according to any of the methods, and in any manner targeted to address any of the problems mentioned in any one or more of: U.S. Pat. Nos. 8,465,667, 8,298,439, 5,714,387, 5,181,957, 4,417,992, International Patent Applications WO 2010/085435, WO 2010/045448, WO 2008/100921, WO 2006/041581, US Published Patent Applications 2010/0090160, 2009/0127499, 2008/0190160, 2006/0284137, 2006/0078685, German Patent Document DE 2912326, and any combination thereof.

In at least one embodiment the particulate material is drying slurry. Often in industrial applications a particulate material is or becomes heavily intermixed with water or another liquid and forms slurry. This slurry needs to have some or all of the liquid removed before a subsequent process can be performed on the material. While drying (whether by a de-watering technique or if left out to evaporate away the liquid by heat, sunlight, or the like) some or all of the slurry dries out and can generate dust emissions. The composition can be applied to a surface of the slurry to control dust emissions. The composition can be applied to the material when it is slurry, partially dry, completely dry, and any combination thereof. In at least one embodiment the slurry is Red Mud from a Bauxite mining and/or refining operation.

The invention can be applied to a substrate having any granulometry. In at least one embodiment the invention is applied to a substrate having granulometry with grains of one or more sizes between 1 nm and 10 m. In particular the invention can be applied to pellet sized materials.

In at least one embodiment the dust that is controlled comprises Sodium Carbonate particles. In at least one embodiment the composition is applied to slurry that is left to dry in a retaining pond or other sort of pond, basin, pool, or straining, drying, or filtering receptacle. In at least one embodiment the particulate material is iron ore.

In at least one embodiment the composition is applied as the pile is being formed. When a particulate material is poured or dumped to form a pile, some of the material billows away from the pile in form of airborne dust. This can occur for example when material is loaded into a rail car, dump truck, storage facility, silo, or ship's hold. The composition can be applied to the material before and/or as it is poured or dumped into a pile. In at least one embodiment the material passes along a conveyer belt before it is poured or dumped and the composition is applied to the material as it travels along the belt. In at least one embodiment the composition also functions as a tackifier which holds together the material in the form of larger clumps that are less likely to launch as airborne dust.

Without being limited by a particular theory or design of the invention or of the scope afforded in construing the claims, it is believed that when combined the two compositions form a gel matrix that affords optimal binder properties. Binders can be thought of as being in one of three categories: 1) rigid (often polymerized) layers like a carapace, 2) glue products that do not form a layer but keep the particles bonded due tackiness, and 3) intermediate products that form a layer with gel characteristics.

The advantage of a rigid layer is that it is less susceptible to wear by the wind but on the other hand it can crack more easily due vibrations and mechanical stress what would lead to material loss. A product that keep the particles bonded due stickiness should not suffer the effect of vibration and mechanical stress but it may evaporate or infiltrate into the ore and then loose its effect. The inventive gel-like layer combines both benefits; it is not be damaged by the wind or vibration and is resistant to becoming dried out or drained.

Gels however are not used because it is not commercially viable to spray gel directly over particulate material beds due the high viscosity which requires very high pressure pumps. The invention however allows users to gain the benefits of gels without the difficulties by spraying two or more different low viscosity liquids that only react to form a gel after application to the bed. In at least one embodiment the resulting gel is not a glue. In at least one embodiment the resulting gel is a glue.

Only once before has the attempt been made to use a two-step application as a particulate material binder, in the Russian Patent Document RU 2303700, tiled *Method to Consolidate Dust-Forming Surfaces of Iron-Ore Concentration waste Storages,* by Sergeev S., et al. (2007). In RU 2303700 an iron particle substrate was first treated with chalk then with sulfuric acid. The inventive method however uses dissimilar materials. Also the inventive method is not limited to iron. In at least one embodiment the method excludes applying substantially any (or essentially any) chalk to the particulate material. In at least one embodiment the method excludes applying substantially any (or essentially any) sulfuric acid to the particulate material. In at least one embodiment the method excludes applying substantially any (or essentially any) acid to the particulate material. In at least one embodiment the particulate material excludes iron.

The invention however displays a number of unexpected advantages over the use of RU 2303700's chalk-sulfuric acid. RU 2303700's chalk-sulfuric acid treatment results in the formation of a brittle gypsum layer that is rigid and friable. It will not keep its integrity during transport in rail cars because it will break due vibration and mechanical stress. In contrast the invention protects the particulate material by covering it with a flexible (gel) layer that much better withstands vibration and mechanical stress.

In addition the invention is much safer than using RU 2303700's chalk-sulfuric acid treatment because it does not require the manipulation of sulfuric acid. Spraying sulfuric acid is an innately dangerous activity. It introduces safety issues to the environment, to people, to the rail road (corrosion), and even to the process. Particulates may react with the acid and be partially dissolved. Were that to happen a cloud of explosive (hydrogen) gas could form and the danger would be multiplied several times. Thus the invention is incalculably safer, and more practical than that described in RU 2303700.

In at least one embodiment immediately after the first liquid is applied onto the bed the second liquid, that reacts with the first, is also sprayed and a gel layer is formed directly on top of the bed.

In at least one embodiment the gel forms between 1 second to 5 hours after the two or more compositions contact each other.

In at least one embodiment the gel is applied only to the surface of the bed. In at least one embodiment the gel is applied in an amount insufficient to impart sufficient tackiness to preserve the bed against erosion but because it is a gel it effectively prevents erosion. Typically, glues also have high viscosity, around 4000 cP and 10000 cP. As a result, glues cannot be easily applied. As a result, glue materials are often dissolved in a solvent (often water) and then applied. This imposes limitations on resulting concentrations as the applied solution often only has a viscosity of between 10 cP to 100 cP when applied. The inventive gel in contrast can reach viscosities as high as 50,000 cP (and higher) even though it is applied by being sprayed on the bed's surface.

In at least one embodiment the resulting binder layer is at a dosage, that where a glue to be in such a dosage it would be more fragile and susceptible to shattering than the flexible gel is.

In at least one embodiment the compositions result in a reduction of mass loss of between 0.001 to 100% relative to using a glue type binder, relative to using a polymer type binder, relative to using water, and/or relative to using no binder. The FIGURE illustrates that up to 21.3% (and possibly more) of the cargo could be lost due erosion lift-off. It is estimated that for example in the iron ore industry iron ore total lost during transport in railroads due to erosion lift-off is at least 1.17%. Use of the invention would drastically reduce this amount.

In at least one embodiment at least one of the compositions has a viscosity of 1 to 100 cP, (possibly 50-100 cP), preferably between 1 and 50 cP, and most preferably between 1 and 10 cP prior to contact with the other composition.

In at least one embodiment when the two compositions contact each other they result in a viscosity of between 1000 cP and 10,000 cP, preferably between 10,000 cP and 40,000 cP, and most preferably between 13,000 cP and 17,500 cP.

EXAMPLES

The foregoing may be better understood by reference to the following examples, which are presented for purposes of illustration and are not intended to limit the scope of the invention. In particular the examples demonstrate representative examples of principles innate to the invention and these principles are not strictly limited to the specific condition recited in these examples. As a result it should be understood that the invention encompasses various changes and modifications to the examples described herein and such changes and modifications can be made without departing from the spirit and scope of the invention and without diminishing its intended advantages. It is therefore intended that such changes and modifications be covered by the appended claims.

A sample of pellet feed iron ore had a water content of approximately 8.0% and few large particles. Since large size particles (30 mm) could strongly interfere in dust dispersion at laboratory scale due its high blockage of the surface, sample of pellet feed was previously sieved in 10 mm mesh before its use. After particle size selection the sample was used without any further modification.

Dust control products were dissolved in water in such concentration suitable to be sprayed over the surface of the iron ore bed. Composition 1 was a commercially available source of Triethanolamine was diluted to 0.2%. Composition 2 was a commercially available source of Carboxymethylcellulose was diluted to 0.5%. Composition 3 was a commercially available source of Diethanol coconut amide was diluted to 0.5%.

The compositions were applied to beds within rectangular containers. Each container was 24.0 centimeters long, 10.0 centimeters wide and 6.5 centimeters deep. The containers were filled with untreated iron ore pellet feed until a good portion of the material has been deposited on top of the container forming an elongated pyramidal like shape. All angles of the roof were verified by the use of a 45 degree angular compass.

After been placed inside the container the surface of the iron ore pellet feed was uniformly sprayed with one or both compositions at various concentrations. At industrial level, the usual amount of a typical dust control binder sprayed onto the top of a single iron ore car is 80 L at 1.5% concentration. Considering each car with 22 $m^2$ area this means 3.64 L/m2 dosage. During laboratory trials the application of dust control products followed as close as possible this volume of liquid per area by changing the concentration of the applied solution.

In order to guarantee that each iron ore bed received the right amount of binder only the iron ore surface was exposed to the spray. Any drop that touched the external surface of the container was dried using towel paper. Dosage amount was meticulously controlled by weighting the iron ore bed during spray application until the target final mass was achieved. After the application of the dust control product to be tested the ore surface was left to dry either at room temperature inside a fume hood overnight or inside an oven at 110° C. for one hour. After that time the container with treated iron ore was submitted to lift-off trial.

Sample Preparation

The sample of pellet feed iron ore used presented water content of approximately 8.0% and few large particles. Since large size particles (30 mm) could strongly interfere in dust dispersion at laboratory scale due its high blockage of the surface, sample of pellet feed was previously sieved in 10 mesh before its use. After particle size selection the sample was used without any further modification.

Dust control products were dissolved in water in such concentration suitable to be sprayed over the surface of the iron ore bed. In few cases the high viscosity of final mixture did not allowed the product to be sprayed and in these cases the product was applied trickling viscous gel over the surface of the iron ore bed and completely removing any dripping excess.

Dust Lift-Off Trials

All experiments were carried out using rectangular containers. Each container was 24.0 centimeters long, 10.0 centimeters wide and 6.5 centimeters deep. The containers were filled with untreated iron ore pellet feed until a good portion of the material has been deposited on top of the container forming an elongated pyramidal like shape. All angles of the roof were verified by the use of a 45 degree angular compass.

After been placed inside the container the surface of the iron ore pellet feed was uniformly sprayed with one of the compositions or with a mixture at proper concentration. At industrial level, the usual amount of product that is sprayed onto the top of a single iron ore car is typically 80 L at 1.5% concentration. Considering each car with 22 m2 area this means 3.64 L/m2 dosage. During laboratory trials the application of dust control products followed as close as possible this volume of liquid per area by changing the concentration of the applied solution.

In order to guarantee that each iron ore bed received the right amount of binder only the iron ore surface was exposed to the spray. Any drop that touched the external surface of the container was dried using towel paper. Dosage amount was meticulously controlled by weighting the iron ore bed during spray application until the target final mass was achieved.

After the application of the dust control product to be tested the ore surface was left to dry either at room temperature inside a fume hood overnight or inside an oven at 110° C. for one hour. After that time the container with treated iron ore was submitted to lift-off trial.

Lift-off measurements were based on weight loss balance. The iron ore bed, after the drying period, was placed over a vibratory platform in order to simulate the series of impacts that an iron ore car suffer during transport. Vibration was approximately 53.3 Hz with amplitude of 2.5 mm. At the same time the ore bed was submitted to a room temperature air stream corresponding to a flow of 970 L/min or 60.5 km/h wind considering tubing with 35 mm of diameter. The duration of each trial was 15 minutes.

Weight of the iron ore bed was measured before and after the lift-off trial and the efficiency of the dust control products was determined based on the percentage of iron ore lifted-off at the end of the experiment. Pictures of each iron ore bed were taken before and after the lift-off trial. (Representative examples of which are shown in the FIGURE).

Blank Trials

In order to obtain a significant baseline for the lift-off trials two set of blank experiments were carried out. The first experiment was carried out spraying just water on the surface of the ore bed. After that it was left to dry inside a fume hood overnight and then it was submitted to an air flow of 970 L/min for one hour that corresponds to 60.5 km/h wind considering a pipeline with 35 mm of diameter. The iron ore weight loss was measured after 15 minutes.

The second experiment was performed in the same way as the second but in this case the iron ore bed surface was previously dried for one hour at 110° C. inside an oven and then submitted to regular lift-off conditions. Table 1 illustrates the results of the experiments.

TABLE 1

| Drying | Product | Applied Dosage (g/m2) | Mass Loss (%) |
|---|---|---|---|
| air 17 h | Composition 1 0.2% after Composition 2 0.1% | 3.1 after 2.8 | 0.4% |
| air 17 h | Composition 1 0.2% after Composition 2 0.5% | 1.9 after 11.9 | 0.4% |
| air 17 h | Composition 1 0.2% after Composition 3 0.5% | 2.0 after 11.4 | 0.4% |
| oven 1 h | Water (blank) | 51.0 | 15.8% |
| oven 1 h | Water (blank) | 46.0 | 19.1% |
| air 17 h | Water (blank) | 42.0 | 14.9% |
| air 0.5 h | Composition 2 0.5% after Composition 1 0.2% | 12.0 after 3.0 | 0.9%* |

*Weight loss measured after 7 hours under lift-off conditions.

Other examples measured after more than 7 hours under air flow showed a similar degree of binder robustness. This data demonstrates that the inventive mixture is unexpectedly effective as a particulate material binder.

While this invention may be embodied in many different forms, there are described in detail herein specific preferred embodiments of the invention. The present disclosure is an exemplification of the principles of the invention and is not intended to limit the invention to the particular embodiments illustrated. All patents, patent applications, scientific papers, and any other referenced materials mentioned herein are incorporated by reference in their entirety. Furthermore, the invention encompasses any possible combination of some or all of the various embodiments mentioned herein, described herein and/or incorporated herein. In addition the invention encompasses any possible combination that also specifically excludes any one or some of the various embodiments mentioned herein, described herein and/or incorporated herein.

The above disclosure is intended to be illustrative and not exhaustive. This description will suggest many variations and alternatives to one of ordinary skill in this art. All these alternatives and variations are intended to be included within the scope of the claims where the term "comprising" means "including, but not limited to". Those familiar with the art may recognize other equivalents to the specific embodiments described herein which equivalents are also intended to be encompassed by the claims.

All ranges and parameters disclosed herein are understood to encompass any and all subranges subsumed therein, and every number between the endpoints. For example, a stated range of "1 to 10" should be considered to include any and all subranges between (and inclusive of) the minimum value of 1 and the maximum value of 10; that is, all subranges beginning with a minimum value of 1 or more, (e.g. 1 to 6.1), and ending with a maximum value of 10 or less, (e.g. 2.3 to 9.4, 3 to 8, 4 to 7), and finally to each number 1, 2, 3, 4, 5, 6, 7, 8, 9, and 10 contained within the range. All percentages, ratios and proportions herein are by weight unless otherwise specified.

This completes the description of the preferred and alternate embodiments of the invention. Those skilled in the art may recognize other equivalents to the specific embodiment described herein which equivalents are intended to be encompassed by the claims attached hereto.

The invention claimed is:

1. A method of inhibiting the release of dust from a pile of particulate material, the method comprising:

applying to the pile a first composition having a viscosity of less than 100 cP and comprising a viscosity adjustment agent selected from alkylating agents, monoethanolamine, diethanolamine, triethanolamine, diethanol coconut amide, 2-amino 2-methyl 1-propanol or any combination thereof; and applying to the pile a second composition having a viscosity of less than 100 cP and comprising a carboxymethylcellulose, wherein the first and second compositions contact each other to form a mixture having a viscosity of more than 10,000 cP, wherein the first and second compositions do not contact each other before they have both been applied to the pile.

2. The method of claim 1, wherein the first and second compositions are sequentially applied to the pile.

3. The method of claim 1, wherein the first composition, the second composition, or the first and the second compositions comprise a solvent and/or a carrier fluid.

4. The method of claim 1, wherein the pile is within an open topped container.

5. The method of claim 1, wherein the pile comprises iron, coal, dirt, wood chips, agricultural products, fruits, fertilizers, ores, mineral ores, fine materials, sand, gravel, soil, fertilizers, other dust generating material, or any combination thereof.

6. The method of claim 5, wherein the pile extends above the walls of the container.

7. The method of claim 1, wherein the pile is proximal to a railroad car, a ship's hold, a port, a mine, a railroad station, a truck, a road, an industrial facility, a refinery, a smelter, a packaging facility, a power plant, or any combination thereof.

8. The method of claim 1, wherein at least one of the first composition and the second composition is applied by spraying onto the pile.

9. The method of claim 1, wherein both compositions are sprayed sequentially from the same spray apparatus.

10. The method of claim 1, wherein the first composition is applied before the second composition.

11. The method of claim 1, wherein the second composition is applied before the first composition.

12. The method of claim 1, wherein both the first and the second compositions are simultaneously applied from different sprayers.

* * * * *